United States Patent
Knorr et al.

(10) Patent No.: US 12,288,923 B2
(45) Date of Patent: Apr. 29, 2025

(54) GPR DEVICE WITH ADAPTIVE ANTENNA MOUNT

(71) Applicant: PROCEQ SA, Schwerzenbach (CH)

(72) Inventors: Thomas Knorr, Zürich (CH); Samuel Lehner, Zürich (CH); Michael Geiser, Zürich (CH); Antonio Caballero, Volketswil (CH)

(73) Assignee: PROCEQ SA, Schwerzenbach (CH)

(*) Notice: Subject to any disclaimer, the term of this patent is extended or adjusted under 35 U.S.C. 154(b) by 175 days.

(21) Appl. No.: 18/020,499

(22) PCT Filed: Aug. 13, 2020

(86) PCT No.: PCT/EP2020/072817
§ 371 (c)(1),
(2) Date: Feb. 9, 2023

(87) PCT Pub. No.: WO2022/033697
PCT Pub. Date: Feb. 17, 2022

(65) Prior Publication Data
US 2023/0291097 A1    Sep. 14, 2023

(51) Int. Cl.
*H01Q 1/22* (2006.01)
*F16M 11/04* (2006.01)
(Continued)

(52) U.S. Cl.
CPC ............. *H01Q 1/22* (2013.01); *F16M 11/046* (2013.01); *F16M 11/121* (2013.01);
(Continued)

(58) Field of Classification Search
CPC .. H01Q 1/08; H01Q 1/22; H01Q 1/27; H01Q 1/084; H01Q 1/125; H01Q 1/1264; H01Q 1/42; H01Q 1/3233; H01Q 3/06; G01S 7/027; G01S 7/032; G01S 7/2806; G01S 13/04; G01S 13/885; G01S 13/89;
(Continued)

(56) References Cited

U.S. PATENT DOCUMENTS

| 2014/0285375 A1 | 9/2014 | Crain |
| 2016/0061948 A1 | 3/2016 | Ton et al. |

FOREIGN PATENT DOCUMENTS

| CN | 110927715 | 3/2020 |
| JP | 2007-093075 | 4/2007 |

OTHER PUBLICATIONS

Int'l Search Report (Form PCT/ISA/210) conducted in Int'l Appln. No. PCT/EP2020/072817 (May 10, 2021).
(Continued)

*Primary Examiner* — Robert Karacsony
(74) *Attorney, Agent, or Firm* — GREENBLUM & BERNSTEIN, P.L.C.

(57) ABSTRACT

A ground-penetrating radar device comprises a frame, a radar antenna, and an antenna assembly, wherein the antenna is part of the antenna assembly. Further the GPR device comprises a mount for adaptively mounting the antenna assembly to the frame and a ground support for supporting the frame on the ground. In an operational state, the mount prevents a horizontal displacement of the antenna assembly relative to the frame in two horizontal directions. In the operational state, the mount further allows a vertical displacement of the antenna assembly relative to the frame and a tilting of the antenna assembly relative to the frame.

20 Claims, 4 Drawing Sheets

(51) Int. Cl.
  *F16M 11/12*  (2006.01)
  *F16M 11/20*  (2006.01)
  *F16M 11/42*  (2006.01)
  *G01S 13/88*  (2006.01)
  *H01Q 1/08*   (2006.01)
  *H01Q 1/12*   (2006.01)
  *H01Q 1/42*   (2006.01)

(52) U.S. Cl.
  CPC ......... *F16M 11/2042* (2013.01); *F16M 11/42* (2013.01); *G01S 13/885* (2013.01); *H01Q 1/084* (2013.01); *H01Q 1/1264* (2013.01); *H01Q 1/42* (2013.01); *F16M 2200/025* (2013.01)

(58) Field of Classification Search
  CPC .... F16M 11/046; F16M 11/121; F16M 11/16; F16M 11/18; F16M 11/2042; F16M 11/2092; F16M 11/42; F16M 2200/025
  See application file for complete search history.

(56) References Cited

OTHER PUBLICATIONS

Int'l Written Opinion (Form PCT/ISA/237) conducted in Int'l Appln. No. PCT/EP2020/072817 (May 10, 2021).

GPR DEVICE WITH ADAPTIVE ANTENNA MOUNT

TECHNICAL FIELD

The invention relates to ground-penetrating radar (GPR) device with a mount for adaptively mounting an antenna assembly to a frame of the device.

BACKGROUND ART

In the fields of non-destructive testing and geophysical surveying of a subsurface structure, GPR is a commonly used method, e.g. for detecting rebars in a concrete structure or pipes or other anomalies in the ground. For a good signal and data quality, particularly in terms of signal-to-noise ratio, a good coupling of the radar antenna to the subsurface structure is beneficial. At the same time, it is desired to acquire precise position data, e.g. with a resolution of the order of 1 cm, for the location where the radar data are measured, e.g. by a global navigation satellite system (GNSS) unit.

Conventional GPR devices are often built as a cart with wheels. The GPR antenna is either fixedly attached to the cart or suspended from the cart, e.g. by straps. A drawback of the fixed antenna is its poor coupling to the ground, in particular in case of a bumpy ground surface. On the other hand, a drawback of the suspended antenna is its poor precision in terms of position data. This is due to the fact that the suspension of the antenna, e.g. by straps, does not hold the antenna in a fixed position relative to the GNSS unit on the cart.

DISCLOSURE OF THE INVENTION

Hence, it is a general object of the invention to provide a GPR device with a high data quality, particularly in terms of signal-to-noise ratio and at the same time in terms of a precise positioning.

In order to implement these and still further objects of the invention, which will become more readily apparent as the description proceeds, the GPR device comprises

- a frame: The frame is typically movable relative to ground. The frame may, in particular, be part of a cart that may e.g. be pushed or towed over the ground.
- a radar antenna: The radar antenna is typically configured to transmit and/or receive radar waves into/from the ground.
- an antenna assembly, wherein the radar antenna is part of the antenna assembly: The antenna assembly may comprise a protective plate or a box around the radar antenna. In particular, the antenna assembly may be structured to protect the radar antenna, e.g. when pushed or towed over the ground.
- a mount for adaptively mounting the antenna assembly to the frame: Adaptively means that the mount may offer at least one degree of freedom of movement of the antenna assembly relative to the frame such that it may adapt its position, at least partially, depending on the topology of the ground. In particular, the adaptive mounting allows the antenna assembly to abut on the ground, e.g. also in case of a bumpy ground surface, and to adapt to and follow the ground surface. This, in turn, enables a good coupling of the radar waves into the ground, and thus a high signal-to-noise ratio.
- a ground support for supporting the frame on the ground: The ground support may comprise wheels, typically three or four wheels, or runners or a sled.

In an operational state, the mount prevents a horizontal displacement of the antenna assembly relative to the frame in two horizontal directions. In particular, the mount prevents a displacement of the antenna assembly relative to the frame in any horizontal direction. This enables a high precision of position data acquired simultaneously with the radar data.

Typically, a positioning unit, such as a GNSS receiver, is attached to the frame of the device, not to the antenna assembly. Such positioning unit may reach a positioning precision in the order of 1 cm. Thus, preventing horizontal displacements of the antenna assembly in respect to the frame directly improves the position precision of the radar data. In this way, a high resolution of the radar data itself may be achieved, in particular when compiling data from several radar pulses obtained at different device locations into one image.

On the other hand, the mount allows a vertical displacement of the antenna assembly relative to the frame and a tilting of the antenna assembly relative to the frame in the operational state. As mentioned above, this allows the antenna assembly to adapt to the ground surface, which in turn facilitates a good coupling of the radar waves into the ground and a high signal-to-noise ratio.

In the present context, directions are defined as follows: The ground support of the device defines the bottom part of the device. In an intended use of the GPR device, the bottom part, i.e. the ground support, abuts on the ground.

The part of the device opposite to the ground support, which, in the intended operation, faces away from the ground, is defined to be the top part. The direction between bottom part and top port is termed "vertical", and, in the intended use, is typically perpendicular to the ground.

Typically, the device moves in a "horizontal" direction, which, in the intended use, is parallel to the ground.

A horizontal plane, which comprises all horizontal directions, is defined by the ground support of the device. In particular, the ground support provides at least three points of contact suitable to support the device on a flat plane—this plane is, by definition, the horizontal ground plane.

"Tilting" particularly means a rotation around a horizontal axis.

Further, the terms "allowing" and "preventing" certain displacements or certain tilts may be understood as follows. "Prevent": A maximum horizontal displacement of the antenna assembly in respect to the frame is advantageously less than 1 cm, in particular less than 0.5 cm. "Allow": A maximum vertical displacement of the antenna assembly in respect to the frame is advantageously more than 5 cm, in particular more than 10 cm. A maximum tilt of the antenna assembly in respect to the frame is advantageously more than 10 degrees, in particular more than 20 degrees. Such displacements or tilts are possible in the operational state whereas they may be blocked, i.e. prevented altogether in a blocked state (see below) of the device.

In an embodiment, a maximum vertical displacement of the antenna assembly in respect to the frame is, in the operational state, larger than a maximum horizontal displacement of the antenna assembly in respect to the frame, in particular by a factor of 5, more particularly by a factor of 10.

Advantageously, the mount allows the antenna assembly to be lowered to a bottom level of the ground support in the operational state. In particular, the mount allows the antenna assembly to be lowered to the horizontal ground plane as defined above.

In an embodiment, the antenna assembly is tiltable relative to the frame around two, in particular horizontal, axes in the operational state. Thus, the antenna assembly may abut on the ground and closely follow the ground even if the ground is not completely flat, which enables a good coupling of the radar waves into the ground.

Slide Rails and Sliding Elements

In an embodiment, the mount comprises at least three slide rails and at least three sliding elements. In particular, the mount comprises one sliding element per slide rail. In the operational state, the sliding elements are slidable along the slide rails. Thus they may facilitate the vertical displacement of the antenna assembly in respect to the frame. Advantageously, the sliding rails extend essentially vertically. Thus, the antenna assembly held by the mount may slide down under the effect of gravity and may slide up when pushed upwards e.g. by the ground.

Embodiments of the slide rails may comprise, but are not limited to, at least one slit and/or at least one rail element. The sliding elements may comprise at least one bolt slidable in or along the slide rail(s) and/or at least one roller suited to roll along the slide rail(s).

Further, the sliding elements may be tiltable relative to the slide rails around an axis perpendicular to a sliding direction, wherein the sliding direction extends along the slide rail. In this way, the mount does not only facilitate a vertical displacement but also a tilt of the antenna assembly relative to the frame.

In one embodiment, the slide rails are fixedly attached to the antenna assembly and the sliding elements are attached to the frame, whereas it may be the other way round in another embodiment.

Advantageously, the sliding elements are attached to the frame by fit screws. Fit screws are screws having a thread that does not extend all the way from the tip of the screw to the head of the screw, but only along a part of the screw adjacent to the tip. In a part of the screw adjacent to the head, the screw has no thread. Such a fit screw allows to fix the location of the sliding element on the frame while allowing a rotation of the sliding element relative to the frame, and hence a tilt of the antenna assembly.

In an embodiment, the slide rails and/or the sliding elements comprise a non-metallic material forming a sliding surface between the slide rail and the sliding element. The non-metallic material may e.g. be a polymer, more particularly PTFE. Using a non-metallic material for the sliding surface prevents the formation of metallic and thus electrically conducting chippings, e.g. due to wear of friction. Such electrically conducting chips might otherwise come into contact with electronic components of the device, generate a short circuit and thus damage the electronic components. Thus, using a non-metallic material enhances reliability and robustness of the device.

In an advantageous embodiment, the mount comprises four slide rails and four sliding elements. This allows a particularly simple and robust setup of the mount. Advantageously, a first sliding element and a second sliding element are tiltable, in respect to the frame, about a first tilt axis, and a third sliding element and a fourth sliding element are tiltable, in respect to the frame, about a second tilt axis. The first tilt axis and the second tilt axis may extend transversally, in particular perpendicularly, to each other. In particular, the first tilt axis extends along an intended moving direction of the device, which may e.g. be given by the ground support of the device, in particular by the wheels.

Additionally or alternatively, the first tilt axis and the second tilt axis may intersect in an intersection point. In an embodiment, the intersection point is half-way between the third sliding element and the fourth sliding element. Further, the intersection point may be closer to the second sliding element than to the first sliding element. In particular, the intersection point may divide the first tilt axis between the first sliding element and the second sliding element in a ratio greater than 9:1. If the first sliding element is the sliding element closest to the front of the device in the intended moving direction, such location of the intersection point facilitates that the antenna assembly easily tilts around the second tilt axis, and thus that the antenna assembly smoothly follows the ground surface during moving the device.

It is to be understood that the setup of the mount is not limited to using slide rails and sliding elements as described above. In further embodiments, the mount e.g. comprises a gimbal or a ball joint. Both allow a tilting of the antenna assembly relative to the frame. Advantageously, such mount is combined with a suspension allowing a vertical displacement of the antenna assembly relative to the frame. Further, it is advantageous that the antenna is located at, or at least near, a geometrical centre of the gimbal or ball joint. In this way, a horizontal displacement of the antenna assembly relative to the frame in the horizontal direction is prevented when the antenna assembly is tilted.

Blocking Mechanism

In an embodiment, the device further comprises a blocking mechanism for switching the device between the operating state and a blocked state. In the blocked state, the mount blocks the vertical displacement and the tilt of the antenna assembly relative to the frame. This means that the position and orientation of the antenna assembly are fixed relative to the frame in the blocked state. Such blocking mechanism is useful if the transmitting and/or receiving direction of the antenna is to be fixed, e.g. in a detailed survey of a local anomaly in the subsurface.

Advantageously, the blocking mechanism is configured to block the antenna assembly relative to the frame in an upper position, in particular at maximum distance from the bottom level of the ground support, in particular from the horizontal ground plane as defined above. In that case, the antenna assembly does not abut on the ground, at least if the ground is not too bumpy. Thus, such a blocked state is useful for transportation of the device, e.g. in order to prevent mechanical damage. Further, it may be useful for a survey on hard ground, e.g. on a road, in order to avoid wear of friction of the antenna assembly.

In an embodiment, the blocking mechanism comprises a cable, in particular a Bowden cable, for raising the antenna assembly relative to the frame. Such cable may be operable via a lever or a turn-switch that is e.g. attached to the frame.

Further Aspects

The device may further comprise an angle sensor configured to measure the tilt of the antenna assembly relative to the frame or relative to the direction of gravity. Specifically, the angle sensor may be configured to measure the tilt around the two, in particular horizontal, axes. Advantageously, a control unit of the device is configured to receive tilt data from the angle sensor, and to at least one of store and transmit the tilt data together with corresponding radar data from the antenna. In this way, a direction of transmission and/or reception of the radar waves at the antenna may be reconstructed. The tilt data may be used as input for processing the radar data, e.g. for compensating the tilt of the antenna assembly, thus leading to a better image of n the subsurface, in particular with higher resolution and/or higher signal-to-noise ratio.

Alternatively or additionally, the device may comprise a positioning unit, in particular a GNSS unit. The positioning unit is typically mounted to the frame, in particular above the radar antenna, e.g. to avoid interference with the latter. Further, the positioning unit is configured to measure a position of the device. Advantageously, the control unit of the device is configured to receive position data from the positioning unit, and to at least one of store and transmit the position data together with corresponding radar data from the antenna. In connection with the prevention of horizontal displacements of the antenna assembly relative to the frame, this allows a precise positioning where the radar data is acquired. Further, it allows to acquire high-resolution radar data over a wide survey area.

In an advantageous embodiment, the mount extends in an upward direction from the antenna assembly. In that case, the frame is located above the antenna assembly. The antenna assembly and the mount may then be suspended from the frame. This is a simple way to use the effect of gravity to let the antenna assembly adapt to a varying ground in the operational state.

Advantageously, the antenna assembly has a flat bottom surface. In particular, the flat bottom surface may extend at least 10 cm in at least one, in particular in at least two, horizontal directions. This allows that the antenna assembly adapts to the ground and follows variations of the ground smoothly, i.e. without jerky movements.

BRIEF DESCRIPTION OF THE DRAWINGS

The invention will be better understood and objects other than those set forth above will become apparent when consideration is given to the following detailed description thereof. Such description makes reference to the annexed drawings, wherein.

MODES FOR CARRYING OUT THE INVENTION

Figure 1:
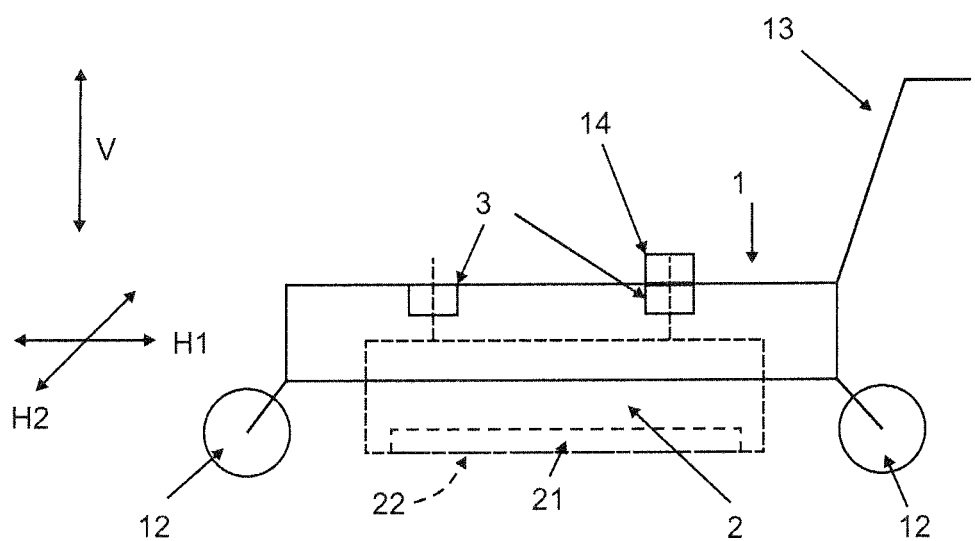
FIG. 1 shows a schematic view of a GPR device according to an embodiment of the invention.

FIG. 1 shows a schematic view of a GPR device according to an embodiment of the invention. The GPR device comprises a frame 1 which is supported on the ground by wheels 12 and may be pushed or pulled on the ground by a handle 13. The wheels 12, typically three or four wheels, define a horizontal plane with horizontal directions H1 and H2. The vertical direction V is perpendicular to the horizontal plane. The wheels 12 are, in normal use, the lowest part of the device.

The device of FIG. 1 further comprises a radar antenna 21 housed in and protected by a box. Advantageously, the box serves as a mechanical protection for the radar antenna 21 and is waterproof, at least to a certain degree. The box and the radar antenna 21 are part of the antenna assembly 2. The antenna assembly 2 comprises a bottom surface 22 which advantageously is made from a durable material and in particular resists abrasive wear. This allows to pull the antenna assembly 2 along the ground, which in turn improves the coupling of sent and received radar waves to the ground.

The antenna assembly 2 is mounted to the frame of the device by means of a mount 3. The mount 3 may e.g. be embodied as sliding blocks slidable in slide rails as depicted in FIGS. 3 to 7. In the operational state, the mount 3 allows the antenna assembly 2 to move vertically and to tilt relative to the frame 1. However, the mount 3 prevents horizontal displacements in both horizontal directions H1 and H2 as described above.

The device further comprises blocking means 14 which are adapted to block the antenna assembly 2 relative to the frame 1 in a blocked state, i.e. to prevent the a vertical displacement and a tilt of the antenna assembly 2 relative to the frame in addition to preventing horizontal displacements. The blocking means 14 may e.g. comprise a cable, in particular a Bowden cable. The cable may be operated by a user of the device through a lever or a turn-switch to lift the antenna assembly 2 upwards relative to the frame 1 and/or to block the antenna assembly 2 in a defined vertical position, in particular in the uppermost position, relative to the frame 1.

Figure 2:
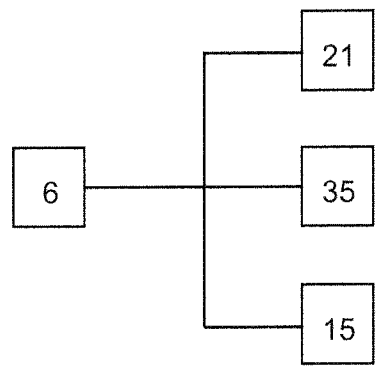
FIG. 2 shows a block diagram with functional elements of a GPR device according to an embodiment of the invention.

FIG. 2 shows a block diagram of functional elements, in particular of electronic parts, of a GPR device according to the invention. The device comprises a control unit 6, e.g. a processor or an FPGA. The antenna 21 is connected to and controlled by the control unit 6.

Further, the device advantageously comprises an angle sensor 35 connected to the control unit 6. The angle sensor 35 is configured to measure an angle of the antenna assembly 2 relative to the frame 1 or relative to the direction of gravity. In the latter case, the angle sensor 35 may comprise an accelerometer. Data about the angle of the antenna assembly 2 relative to the frame 1 or relative to the direction of gravity may be used to compensate the acquired radar data for a tilt of the rats antenna 21.

Further, the device advantageously comprises a positioning unit 15, e.g. a GNSS receiver, connected to the control unit 6. Typically, the positioning unit 15 is attached to the frame 1 rather than to the antenna assembly 2 for reasons of a better visibility or reception of the GNSS signal. Data from the positioning unit 15 is used to locate the acquired radar data in a reference frame. With present positioning methods, e.g. differential GNSS measurements, a positioning precision in the order of 1 cm is feasible. In order to fully exploit the positioning precision when processing or interpreting the radar data, it is necessary to prevent horizontal displacements of the antenna assembly 2 relative to the frame 1.

Figure 3:
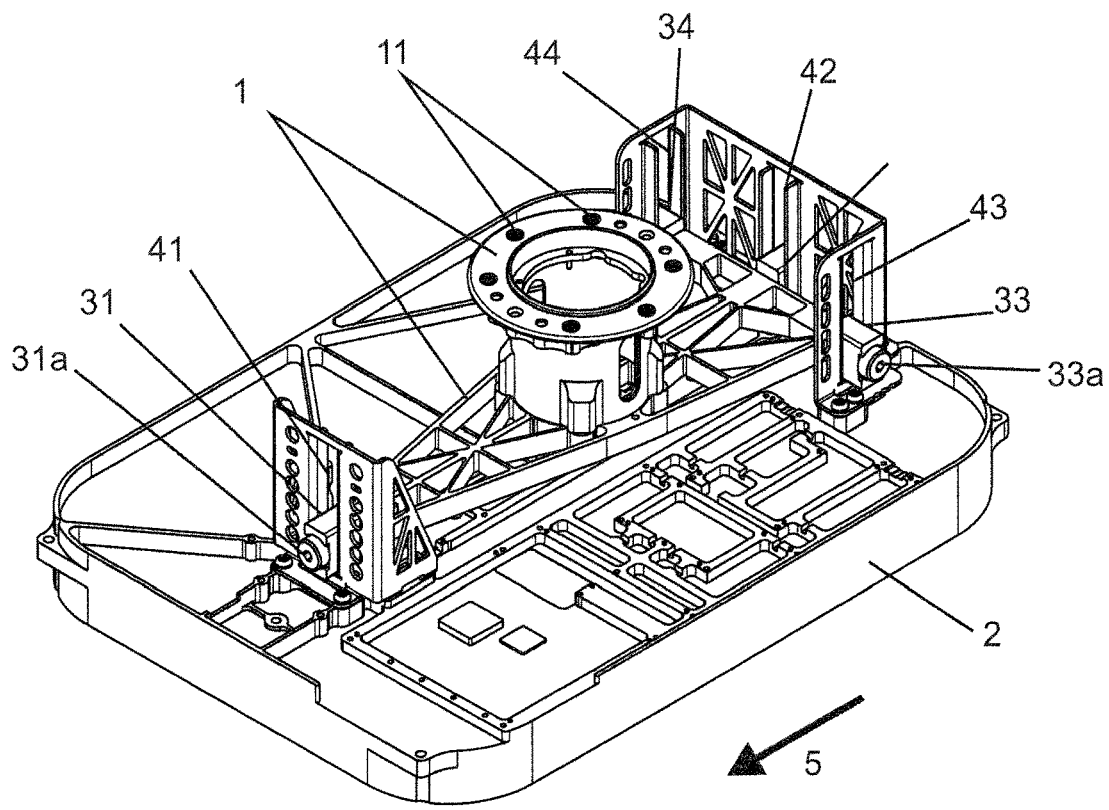
FIG. 3 shows a perspective view of a part of the GPR device including the antenna frame, the mount and part of the frame according to an embodiment of the invention.

FIG. 3 shows a perspective view of a part of the GPR device according to an embodiment of the invention. The shown features include a part of the frame 1, which in operation is attached to the rest of the device, e.g. comprising a cart as in FIG. 1 that is to be moved over the ground during a GPR survey. In particular, the part of the frame 1 shown in FIG. 3 is screwed to the rest of the device by means of six screws screwed into six threaded holes 11. The frame may comprise or be made of aluminum.

A radar antenna 21 is part of and housed within an antenna assembly 2. Such antenna assembly 2 advantageously is robust in order to protect the antenna from mechanical damage, e.g. from frictional wear. Further, the antenna assembly may be embodied as a closed, and in particular waterproof, box to facilitate a reliable operation of the device under various conditions, such as rain or high humidity. Further, the antenna assembly 2 may house control electronics for the antenna. In contrast, a power supply for the antenna is typically attached to the frame 1. Advantageously, at least a bottom side of the antenna assembly 2 is made of non-metallic material, which may be plastic, such that in operation, the antenna may transmit and receive radar waves into/from the ground without bigger losses.

Figure 4:
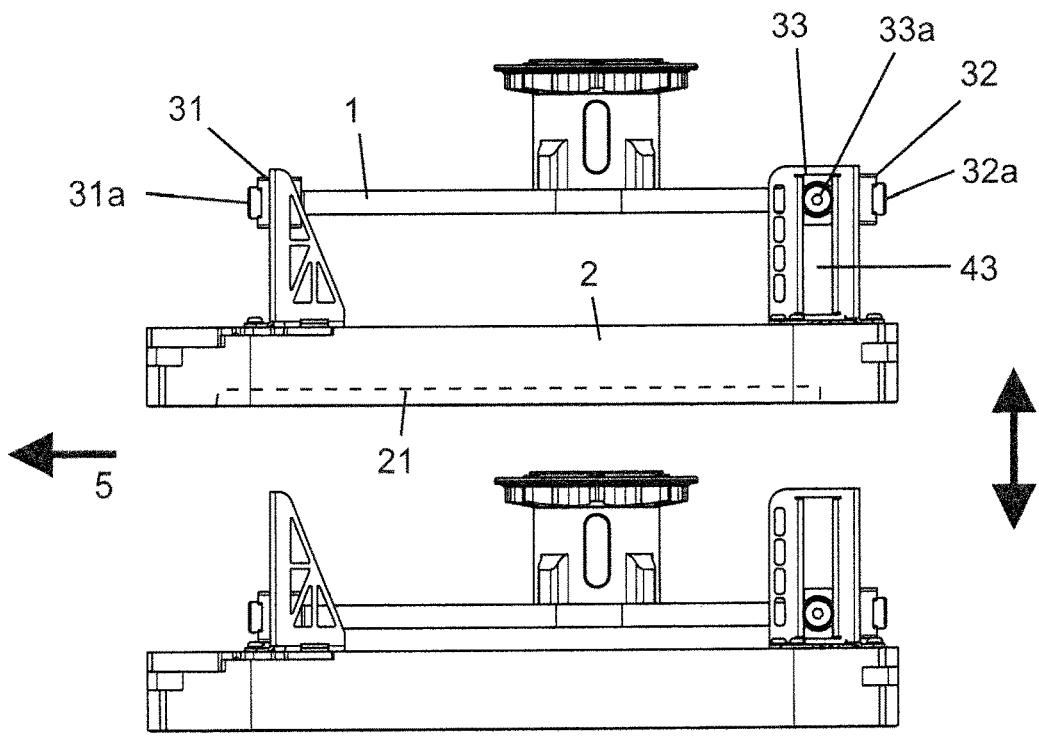
FIGS. 4 to 6 show side views of the part of FIG. 3, illustrating a vertical displacement, a tilt around the second tilt axis and a tilt around the first tilt axis, respectively.

The antenna assembly 2 is adaptively mounted to the frame 1 via a mount. The mount comprises slide rails 41, 42, 43, 44 fixed to the antenna assembly 2, in particular to the top side of the antenna assembly 2. The slide rails may have a length of at least 10 cm, in particular at least 20 cm, thus allowing a vertical displacement of the antenna assembly 2 relative to the frame 1 in the same order of magnitude. Two situations with the antenna assembly 2 in the lowermost and uppermost position relative to the frame 1 are illustrated in FIG. 4 (upper picture and lower picture, respectively).

Further, the slide rails 41, 42, 43, 44 may be made of aluminum. In the embodiment of FIG. 3, the slide rails comprise straight slits. However, they may also be curved in other embodiments.

The mount further comprises sliding elements 31, 32, 33, 34 attached to the frame 1. The sliding elements are slidable in the slits of the slide rails 41, 42, 43, 44, respectively. Advantageously, the sliding elements comprise a non-metallic material forming the sliding surface in order to avoid electrically-conducting chips formed by frictional wear.

In FIG. 3, the sliding elements 31, 32, 33, 34 have two flat side surfaces, with the distance between the side surfaces corresponding to the width of the slits of the slide rails 41, 42, 43, 44 minus a tolerance. The tolerance between sliding element and slide rail is preferably smaller than 1 cm, in particular of the order of 0.5 or 0.1 cm. In this way, a horizontal displacement of the antenna assembly 2 relative to the frame 1 is prevented, i.e. only possible up to said tolerance.

Further, the sliding elements 31, 32, 33, 34 are attached to the frame 1 by fit screws 31a, 32a, 33a, 34a. This enables an easy rotation, i.e. with low friction, of the sliding elements relative to the frame 1, and hence a tilting of the antenna assembly 2 relative to the frame 1, when the antenna assembly 2 adapts its orientation to varying slopes or bumps on the ground.

Figure 5:
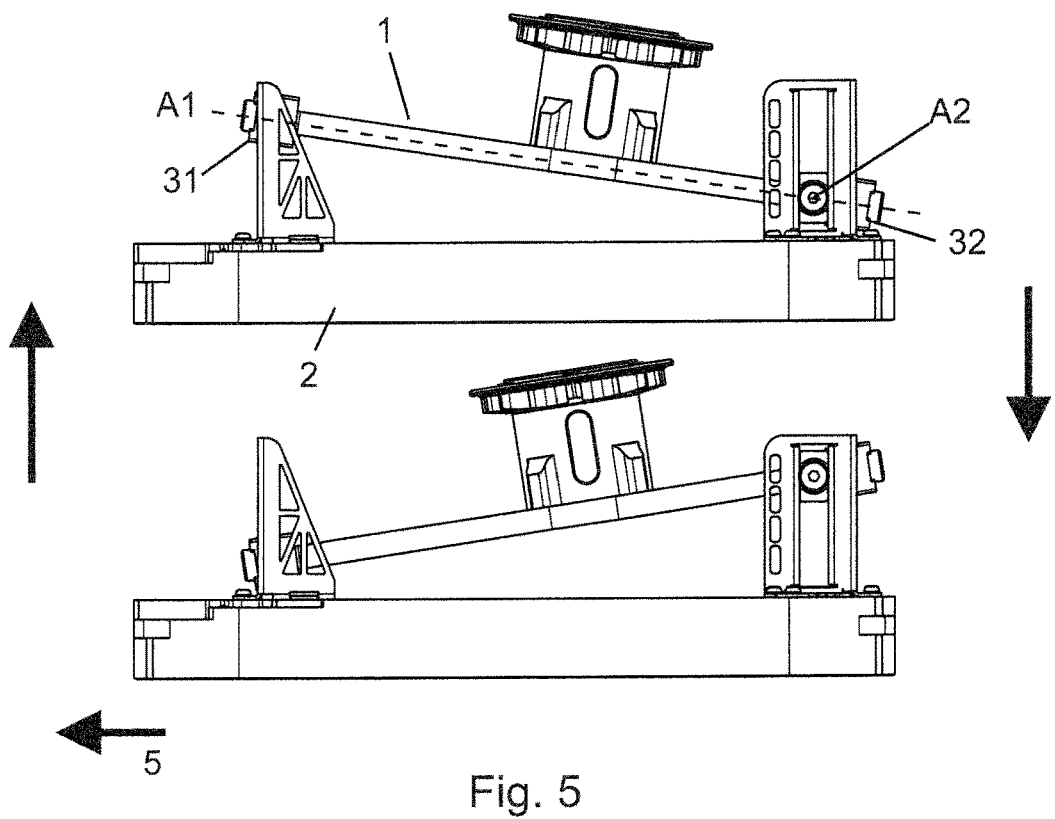
Figure 6:
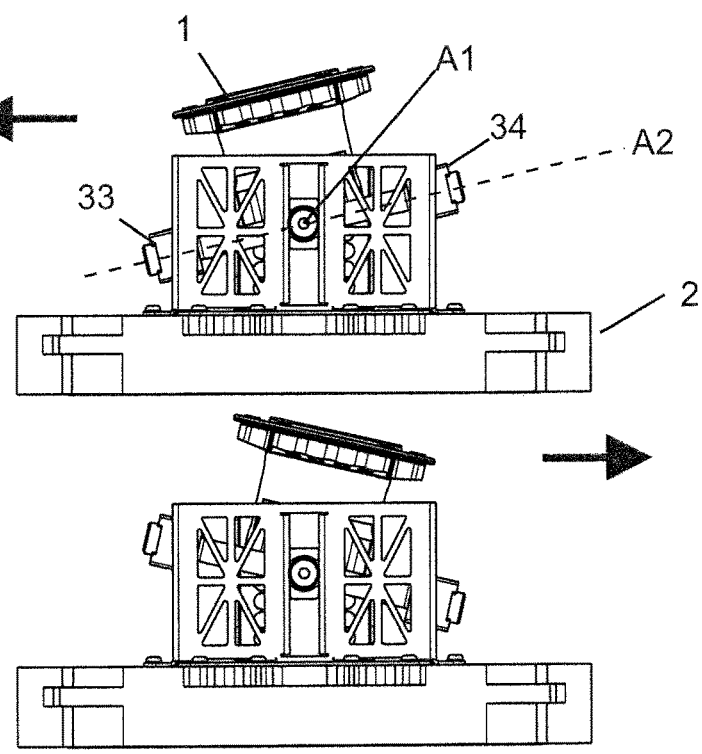

FIGS. 5 and 6 illustrate such tilts of the antenna assembly 2 relative to the frame 1 around a second tilt axis A2 and a first tilt axis A1, respectively. It can be seen that the first tilt axis A1 extends between the sliding elements 31 and 32, whereas the second tilt axis A2 extends between the sliding elements 33 and 34. The first tilt axis A1 in operation typically extends in an intended moving direction 5. The first tilt axis A1 and the second tilt axis A2 intersect perpendicularly in an intersection point P, as can e.g. be seen from FIG. 3 or 7. The intersection point P is located half-way between the sliding elements 33 and 34, but closer to sliding element 32 than to sliding element 31.

In FIG. 3, the antenna assembly 2 is shown in its uppermost position relative to the frame 1. This may be useful in order to protect the antenna assembly 2 from frictional wear, e.g. when surveying on hard surfaces like roads. Hence, the antenna assembly 2 may be blocked to a blocked state in such uppermost position by the blocking mechanism 14, see FIG. 1.

Figure 7:
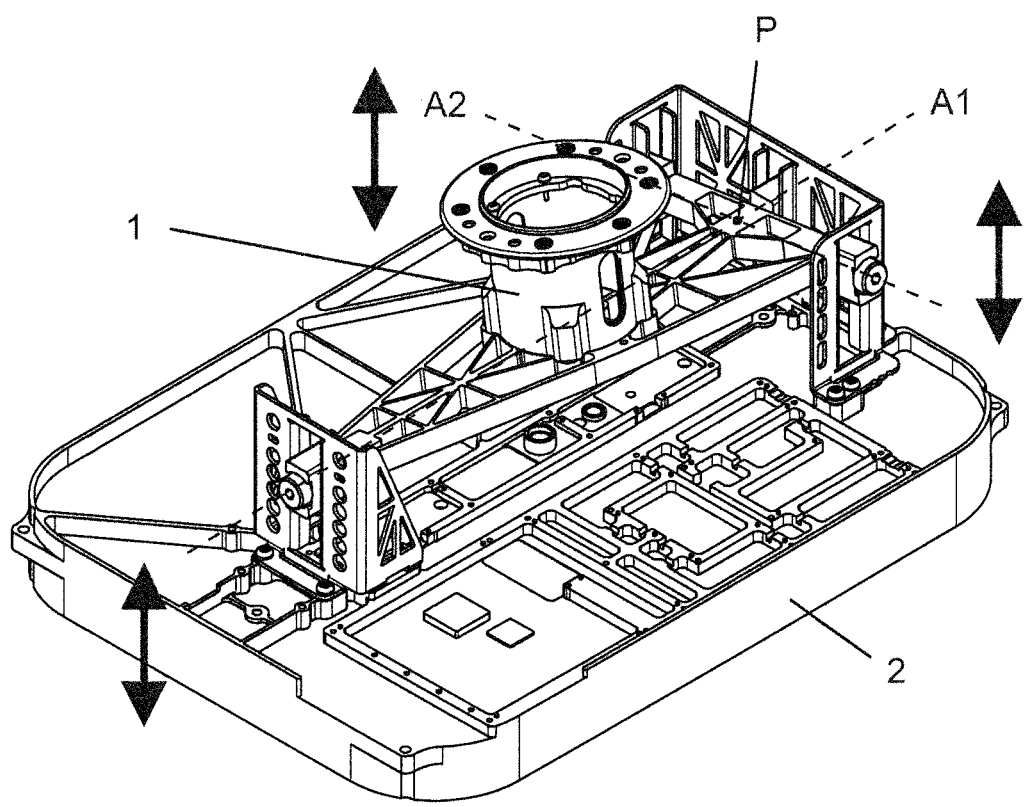
FIG. 7 shows the part of the device of FIG. 3 in an operational state.

In contrast, FIG. 7 shows the part of the device of the previous figures in an operational state. The antenna assembly 2 is not blocked but may be freely slid vertically and tilted around horizontal axes.

As is seen e.g. from FIG. 7, the GPR device according to an embodiment of the invention is adaptable to different grounds, in particular also to bumpy grounds, while always ensuring a good coupling of the antenna to the ground. Moreover, the mount prevents any large horizontal deviation, e.g. above 1 cm, of the antenna assembly 2 relative to the frame 1. This enables a precise positioning during the GPR survey as well as high-resolution GPR images.

While there are shown and described presently preferred embodiments of the invention, it is to be distinctly understood that the invention is not limited thereto but may be otherwise variously embodied and practiced within the scope of the following claims.

The invention claimed is:

1. A ground-penetrating radar device comprising
  a frame,
  a radar antenna,
  an antenna assembly, wherein the radar antenna is part of the antenna assembly, and
  a mount for adaptively mounting the antenna assembly to the frame,
  a ground support for supporting the frame on a ground,
  wherein in an operational state,
  the mount prevents a horizontal displacement of the antenna assembly relative to the frame in two horizontal directions, and
  the mount allows a vertical displacement of the antenna assembly relative to the frame and a tilting of the antenna assembly relative to the frame.

2. The device according to claim 1,
  wherein in the operational state, the mount allows the antenna assembly to be lowered to a bottom level of the ground support.

3. The device according to claim 1,
  wherein in the operational state, a maximum vertical displacement of the antenna assembly is larger than a maximum horizontal displacement of the antenna assembly by a factor of 5.

4. The device according to claim 1,
  wherein in the operational state, at least one of:
  a maximum horizontal displacement of the antenna assembly is less than 1 cm,
  a maximum vertical displacement of the antenna assembly is more than 5 cm,
  a maximum tilt of the antenna assembly is more than 10 degrees.

5. The device according to claim 1,
  wherein in the operational state, the antenna assembly is tiltable relative to the frame around two axes.

6. The device according to claim 1,
  wherein the mount comprises
    at least three slide rails, and
    at least three sliding elements, one sliding element per slide rail,
  wherein in the operational state, the sliding elements are slidable along the slide rails, facilitating the vertical displacement of the antenna assembly.

7. The device according to claim 6,
  wherein the sliding elements are tiltable relative to the slide rails around an axis perpendicular to a sliding direction along the slide rail.

8. The device according to claim 7,
wherein the slide rails are fixedly attached to the antenna assembly and the sliding elements are attached to the frame, and/or
wherein the sliding elements are attached to the frame by fit screws.

9. The device according to claim 6,
wherein the slide rails and/or the sliding elements comprise a non-metallic material forming a sliding surface between the slide rail and the sliding element.

10. The device according to claim 6,
wherein the mount comprises four slide rails and four sliding elements,
wherein a first sliding element and a second sliding element are tiltable, in respect to the frame, about a first tilt axis, and a third sliding element and a fourth sliding element are tiltable, in respect to the frame, about a second tilt axis.

11. The device according to claim 10,
wherein the first tilt axis and the second tilt axis extend transversally to each other,
wherein the first tilt axis extends along an intended moving direction of the device.

12. The device according to claim 10,
wherein the first tilt axis and the second tilt axis intersect in an intersection point.

13. The device according to claim 12,
wherein the intersection point is closer to the second sliding element than to the first sliding element.

14. The device according to claim 1 further comprising:
a blocking mechanism for switching the device between the operating state and a blocked state,
wherein in the blocked state, the mount blocks the vertical displacement and the tilt of the antenna assembly relative to the frame.

15. The device according to claim 14,
wherein the blocking mechanism is configured to block the antenna assembly relative to the frame in an upper position.

16. The device according to claim 14,
wherein the blocking mechanism comprises a cable for raising the antenna assembly relative to the frame.

17. The device according to claim 1 further comprising:
an angle sensor configured to measure a tilt of the antenna assembly relative to the frame or relative to a direction of gravity,
wherein a control unit of the device is configured to receive tilt data from the angle sensor, and to at least one of store and transmit the tilt data together with corresponding radar data from the radar antenna.

18. The device according to claim 1 further comprising:
a positioning unit mounted to the frame and configured to measure a position of the device,
wherein a control unit of the device is configured to receive position data from the positioning unit, and to at least one of store and transmit the position data together with corresponding radar data from the radar antenna.

19. The device according to claim 1,
wherein the mount extends in an upward direction from the antenna assembly,
wherein the frame is located above the antenna assembly, and
wherein the antenna assembly and the mount are suspended from the frame.

20. The device according to claim 1,
wherein the antenna assembly has a flat bottom surface,
wherein the flat bottom surface extends at least 10 cm in at least one horizontal directions.

* * * * *